(12) United States Patent
Ikesu et al.

(10) Patent No.: US 7,074,265 B2
(45) Date of Patent: Jul. 11, 2006

(54) INK JET RECORDING LIQUID

(75) Inventors: Satoru Ikesu, Fuchu (JP); Takatugu Suzuki, Hachioji (JP); Mari Takahashi, Asaka (JP)

(73) Assignee: Konica Minolta Holdings, Inc., Tokyo (JP)

( * ) Notice: Subject to any disclaimer, the term of this patent is extended or adjusted under 35 U.S.C. 154(b) by 0 days.

(21) Appl. No.: 10/861,263

(22) Filed: Jun. 4, 2004

(65) Prior Publication Data

US 2004/0254262 A1 Dec. 16, 2004

(30) Foreign Application Priority Data

Jun. 12, 2003 (JP) ............................. 2003-167608

(51) Int. Cl.
*C09D 11/02* (2006.01)
(52) U.S. Cl. .................... 106/31.47; 523/160; 523/161
(58) Field of Classification Search ............. 106/31.47; 523/160, 161; 546/76
See application file for complete search history.

(56) References Cited

U.S. PATENT DOCUMENTS

| 3,126,280 | A | * | 3/1964 | Blout et al. ................. 430/243 |
| 4,088,572 | A | * | 5/1978 | Cooper et al. ................. 546/74 |
| 4,740,581 | A | * | 4/1988 | Pruett et al. ................. 528/289 |
| 5,367,075 | A | * | 11/1994 | Nakamatsu et al. ........... 546/76 |
| 6,152,969 | A | * | 11/2000 | Matsumoto et al. ........... 8/658 |
| 6,460,988 | B1 | | 10/2002 | Mafune et al. .............. 347/100 |
| 6,846,351 | B1 | | 1/2005 | Iwamoto et al. .......... 106/31.47 |
| 6,902,607 | B1 | * | 6/2005 | Matsumoto et al. ..... 106/31.47 |
| 2003/0070580 | A1 | * | 4/2003 | Blease et al. ............ 106/31.27 |
| 2004/0003754 | A1 | * | 1/2004 | Ishibashi et al. ......... 106/31.47 |
| 2004/0106782 | A1 | * | 6/2004 | Iwamoto et al. ............ 534/653 |
| 2004/0134383 | A1 | * | 7/2004 | Matsumoto et al. ..... 106/31.47 |
| 2005/0075500 | A1 | * | 4/2005 | Shankarling et al. ......... 546/76 |

FOREIGN PATENT DOCUMENTS

EP 1063268 * 12/2000
JP 08/029771 * 2/1996

OTHER PUBLICATIONS

English translation of JP08/029771; Feb. 1996.*
Abstract of JP08/029771 from Patent Abstracts of Japan; Feb. 1996.*

* cited by examiner

*Primary Examiner*—Helene Klemanski
(74) *Attorney, Agent, or Firm*—Lucas & Mercanti, LLP

(57) ABSTRACT

An ink jet recording liquid exhibiting superior image color and improved color image fastness is disclosed, comprising a medium and an oil-soluble dye represented by the following formulas

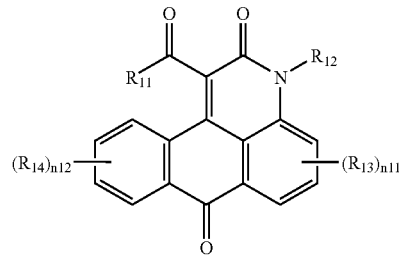

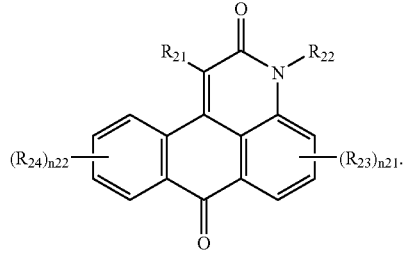

9 Claims, No Drawings

INK JET RECORDING LIQUID

FIELD OF THE INVENTION

The present invention relates to an ink jet recording liquid containing a specific dye and in particular, to an ink jet recording liquid exhibiting superior image color tone and color image fastness.

BACKGROUND OF THE INVENTION

Ink jet recording systems are classified mainly into a system in which droplets are ejected (or expelled) by applying pressure through piezoelectricity-to-mechanical conversion, a system in which bubbles are produced through electricity-to-heat conversion, thereby ejecting droplets under pressure, and a system in which droplets are ejected with suction by an electrostatic force.

Requirements for ink jet inks include, for example, adaptation to the recording system chosen from the foregoing, high recording image density and superior image color, superior color image fastness, rapid fixability onto a recording medium without bleeding of the image, superior storage stability and low cost.

In light of the foregoing, there have been studied and proposed various ink jet recording liquids but ones which simultaneously satisfy many requirements are limited.

Conventional dyes and pigments having known Color Index (C.I.) nimbers described in the C.I. have been studied for use in color image recording with yellow, magenta, cyan and black. Water-soluble dyes including, for example, a xanthene type such as C.I. Acid Red 52 and an azo type such as C.I. Direct Red 20 are known among magenta inks. Whereas these inks have high reliability with respect to not clogging in printers, there are problems in fastness such as light-fastness and water resistance. Inks using quinacridone type pigments such as C.I. Pigment Red 122 are known, which exhibit high fastness but tends to cause problems such as insufficient print density and bronzing. In commonly known conventional dyes and pigments, t is difficult that image color and fastness required for an ink for ink jet recording are compatible with each other.

Recently, in view of the foregoing, there have been proposed various dyes and pigments for use in ink jet recording. Specifically in magenta dyes, an improvement in light-fastness is desired and, for example, an ink containing a water-soluble pyrazole azo dye, for example, was disclosed in JP-A No. 2002-226752 (hereinafter, the term JP-A refers to unexamined Japanese Patent Application Publication). Further, anthrapyridine compounds and a water-based ink composition using the same were disclosed in JP-A Nos. 10-306221, 2000-169776 and 2001-72884. In the art of rapid progress, how ever, their levels are insufficient and desired were further improvements in water resistance and light-fastness.

Occlusion of a dye in dispersed polyurethane or polyester particles was proposed to improve water resistance and light-fastness, as described in JP-A Nos.58-45272, 6-340835, 7-268257 and 7-268260. These techniques achieved improved water resistance and light-fastness but its level was still insufficient, furthermore, producing problems that color tone was not necessarily sufficient and dispersion stability was insufficient when occluded at a relatively high concentration.

SUMMARY OF THE INVENTION

It is an object of the present invention to provide an ink jet recording liquid, specifically magenta ink jet recording liquid which exhibits improved light-fastness of color images and superior color reproduction.

It is another object of this invention to provide a water-based ink jet recording liquid exhibiting not only compatibility of improved light-fastness and color tone but also guaranteed long-term use.

Thus, in one aspect, this invention is directed to an ink jet recording liquid containing an oil-soluble dye represented by the following formula (1):

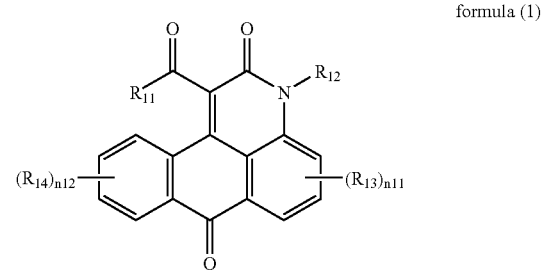

formula (1)

wherein $R_{11}$ is a straight chain alkyl group, an aryl group, an alkoxy group or an aryloxy group; $R_{12}$, $R_{13}$ and $R_{14}$ are each a hydrogen atom or a substituent; n11 is an integer of 1 to 3 and n12 is an integer of 1 to 4.

In another aspect, this invention is directed to an ink jet recording liquid containing an oil-soluble dye represented by the following formula (2):

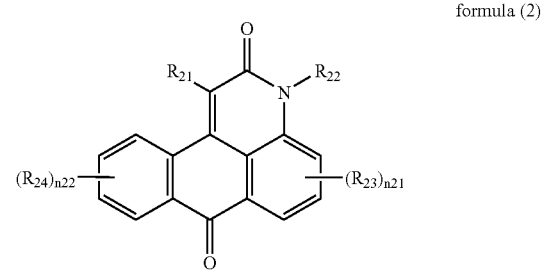

formula (2)

wherein $R_{21}$ is an alkyl group, an aryl group or cyano group; $R_{22}$, $R_{23}$ and $R_{24}$ are each a hydrogen atom or a substituent; n21 is an integer of 1 to 3 and n22 is an integer of 1 to 4.

DETAILED DESCRIPTION OF THE INVENTION

In the formula (1), $R_{11}$ represents a straight chain alkyl group, an aryl group, alkoxy group or an aryloxy group. Examples of a straight chain alkyl group include methyl, ethyl, butyl, and dodecyl. Examples of an aryl group represented by $R_{11}$ include a phenyl group and a naphthyl group and he phenyl group or naphthyl group may be substituted. Examples of an alkoxy group of $R_{11}$ include methoxy, ethoxy, butoxy and dodecyloxy.

In the formula (1), $R_{12}$, $R_{13}$ and $R_{14}$ each represents a hydrogen atom or a substituent. The substituent represented by $R_{12}$ may be any substituent capable of being substituted for the N-atom and representative examples thereof include an alkyl group, an aryl group and a cycloalkyl group. Further, cycloalkyl, alkynyl, acyl, heterocycle, sulfonyl, sulfinyl, phosphonyl, acyl, carbamoyl, sulfamoyl, alkoxy, aryloxy, alkylamino, alkoxycarbonyl, aryloxycarbonyl and hydroxy groups, spiro-compound residue and bridged hydrocarbon residue are also cited.

Substituents represented by $R_{13}$ are not specifically limited and representative examples thereof include alkyl, aryl, anilino, acylamino, sulfonamido, alkylthio, arylthio, alkenyl, and cycloalkyl groups. In addition thereto, a halogen atom, cycloalkenyl, alkynyl, heterocycle, sulfonyl, sulfinyl, phosphonyl, acyl, carbamoyl, sulfamoyl, cyano, alkoxy, aryloxy, heterocyclic-oxy, siloxy, actloxy, sulfonyloxy, carbamoyloxy, amino, alkylamino, imido, ureido, sulfamoylamino, alkoxycarbonylamino, aryloxycarbonylamino, alkoxycarbonyl, aryloxycarbonyl, heterocyclic-thio, thioureido, carboxy, hydroxy, mercapto, nitro, nitro and sulfo groups, spiro-compound residue and bridged hydrocarbon residue are also cited.

In the formula (1), n11 is an integer of 1 to 3 and n12 is an integer of 1 to 4, and when n11 or n12 are 2 or more, $R_{13}$ or $R_{14}$ may be the same or different.

Next, there will be explained compounds represented by the formula (2). In the formula (2), $R_{21}$ is an alkyl group, an aryl group or cyano group, in which the alkyl group may be straight chain or branched, including methyl, ethyl, isopropyl, octyl and dodecyl. $R_{22}$, $R_{23}$ and $R_{24}$ are each a hydrogen atom or a substituent. Examples of the substituent include the same as cited in the foregoing $R_{12}$, $R_{13}$ and $R_{14}$. In the formula (2), n21 is an integer of 1 to 3 and n22 is an integer of 1 to 4, and when n21 or n22 are 2 or more, $R_{23}$ or $R_{24}$ may be the same or different.

In this invention, the oil-soluble dye refers to a compound exhibiting not more than 1% of the degree of solubility in water at 25° C. and not less than 5% of the degree of solubility in an organic solvent at 25° C. In this regard, organic solvents are not specifically limited and the compound may be any one which exhibits 5% or more of a degree of solubility at 25° C. in at least one of various kinds of organic solvents including hydrocarbons (e.g., hexane, toluene), alcohols (e.g., methanol, ethanol, butanol), ketones (e.g., acetone, methyl ethyl ketone), esters (e.g., ethyl acetate, butyl acetate), amides (e.g., N,N-dimethylformamide), nitrites (e.g., acetonitrile). The degree of solubility refers to the concentration of a saturated solution at a given temperature (in this invention, 25° C.). A preferred compound is one which exhibits 5% or more of a degree of solubility in methyl ethyl ketone or ethyl acetate at 25° C.

Specific examples of the compound of formula (1) or (2) are shown below.

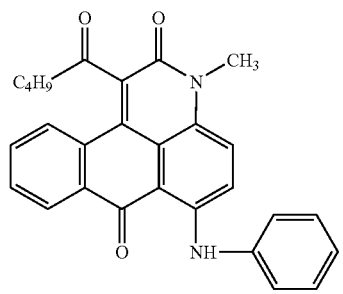

1-1

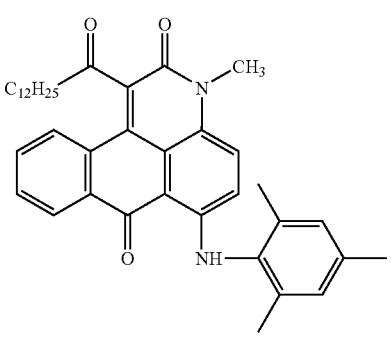

1-2

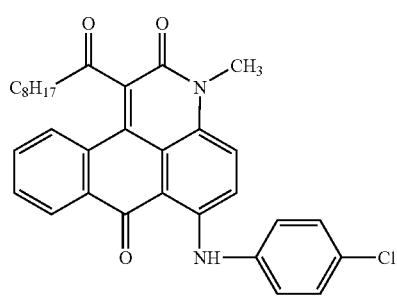

1-3

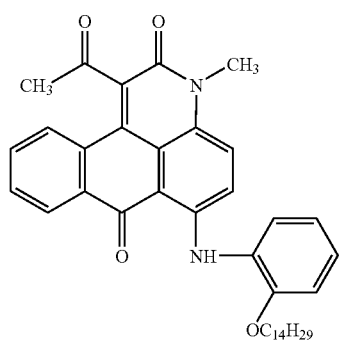

1-4

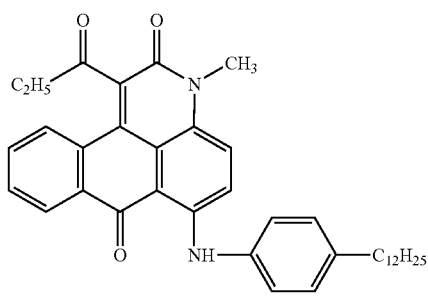

1-5

-continued
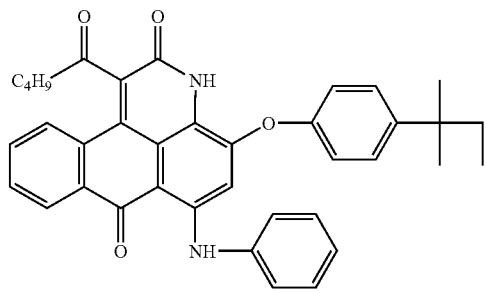
1-6
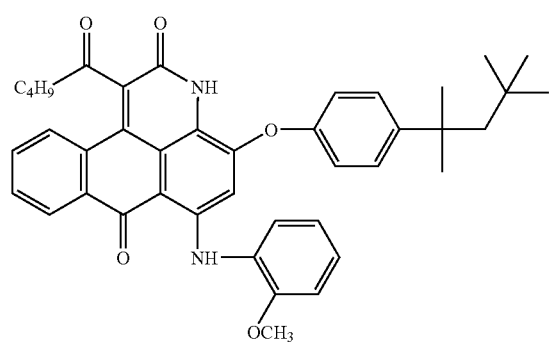
1-7
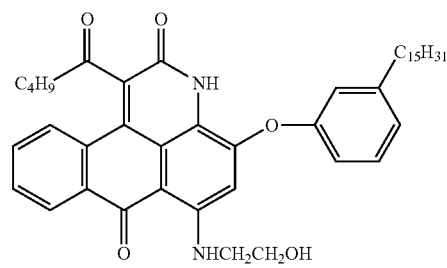
1-8
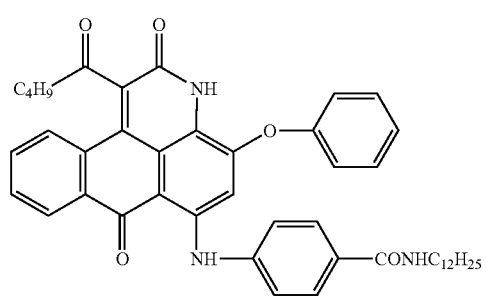
1-9
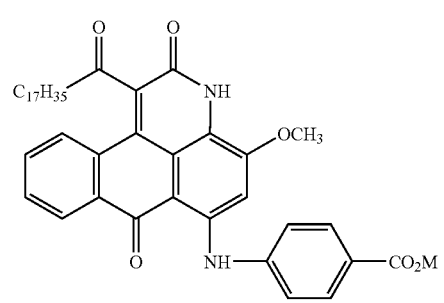
1-10
-continued
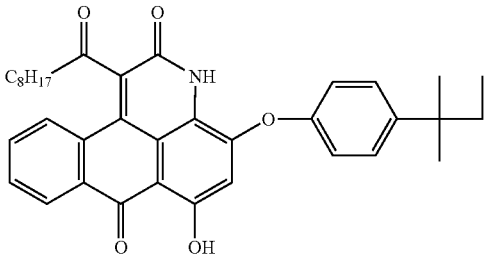
1-11
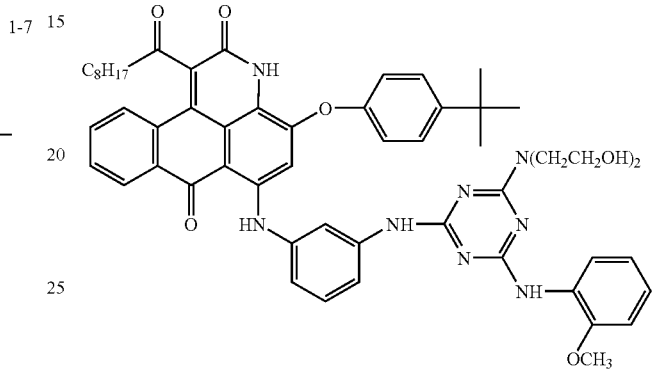
1-12
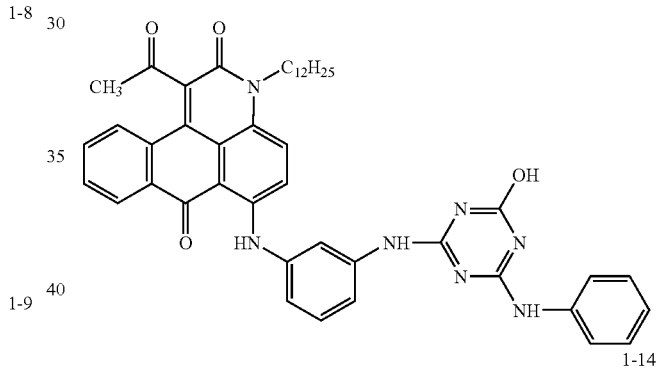
1-13
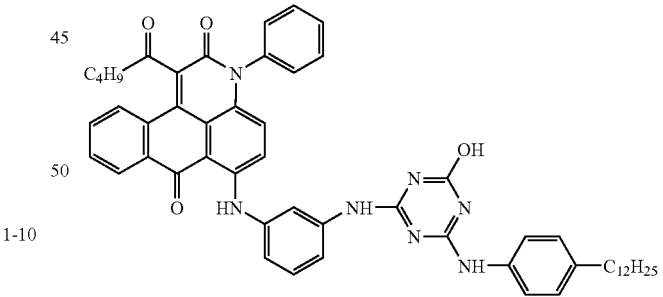
1-14
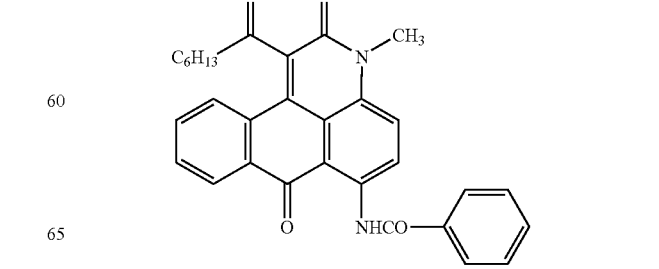
1-15

-continued
1-16
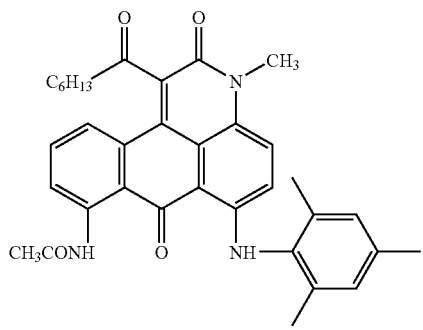
1-17
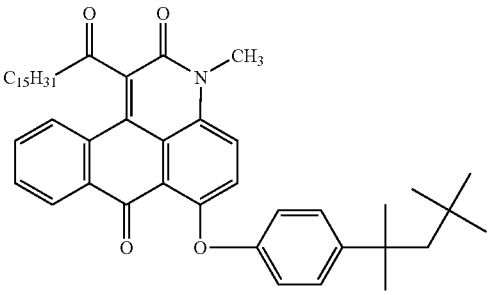
1-18
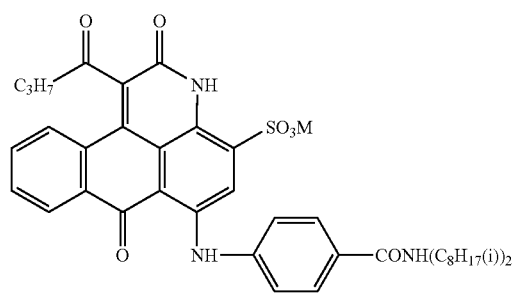
1-19
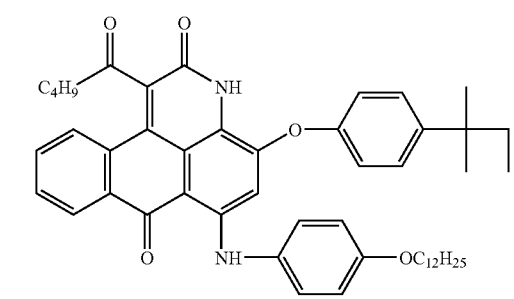
1-20
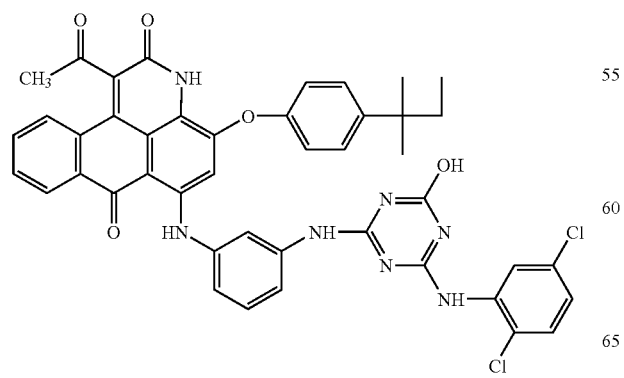
1-21
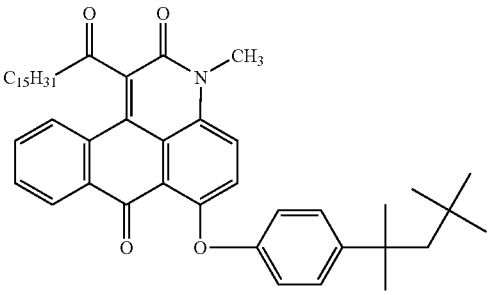
1-22
1-23
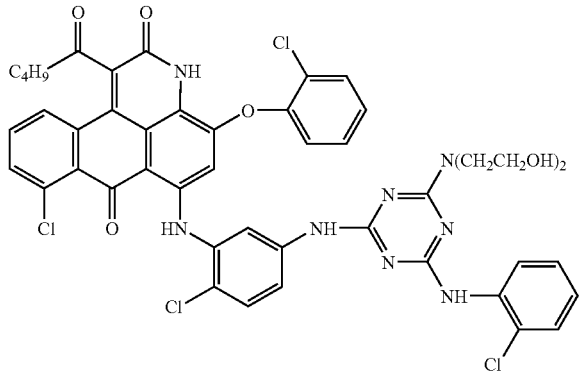
1-24

-continued
1-25
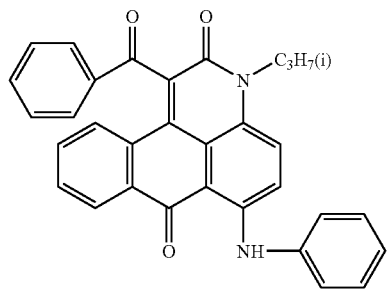
1-26
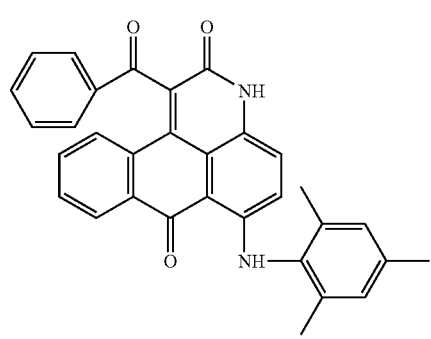
1-27
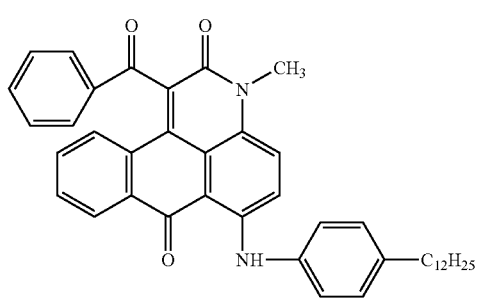
1-28
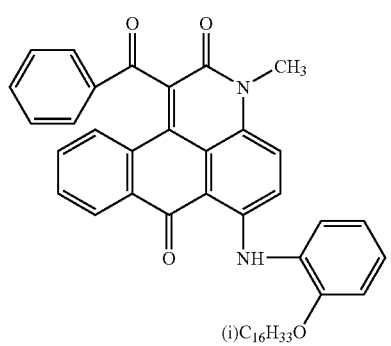
1-29
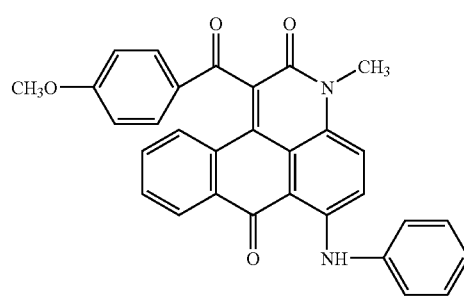
-continued
1-30
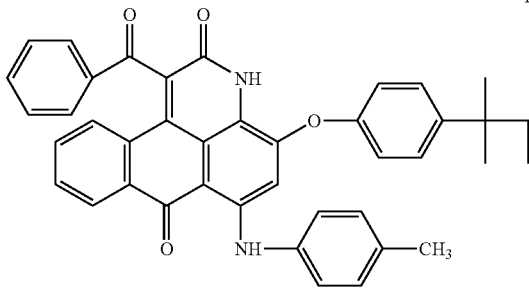
1-31
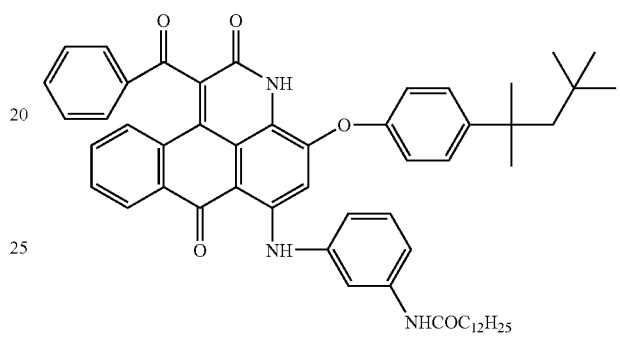
1-32
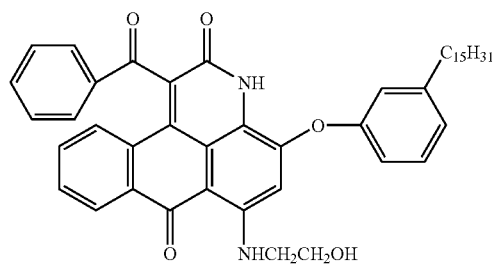
1-33
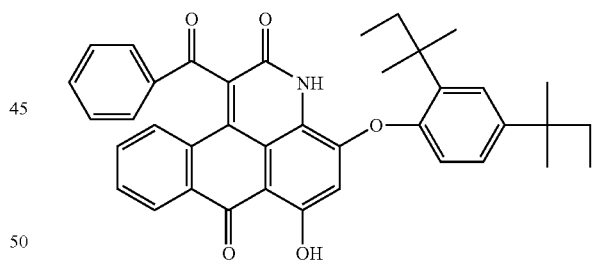
1-34
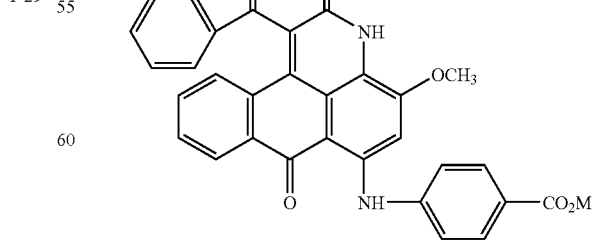

-continued
1-35
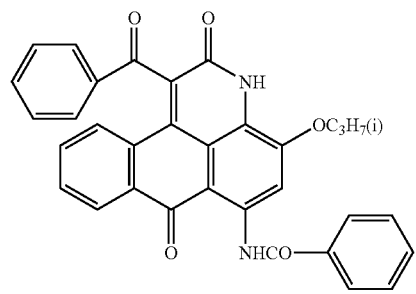
1-36
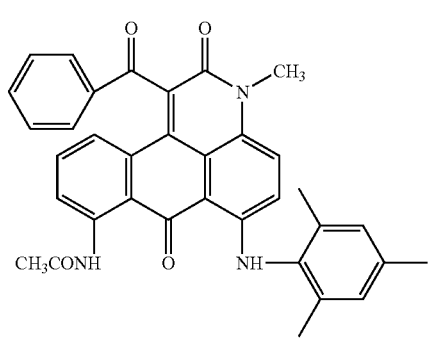
1-37
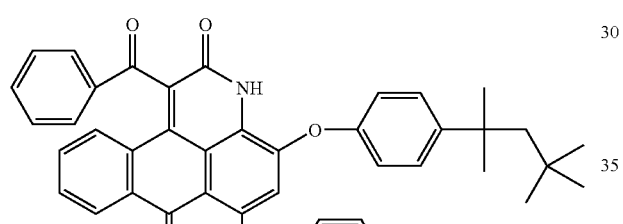
1-38
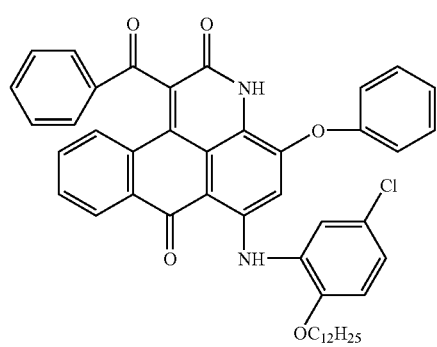
1-39
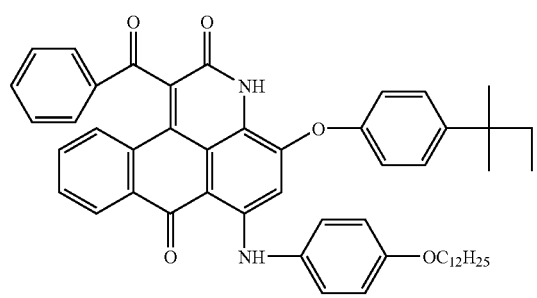
-continued
1-40
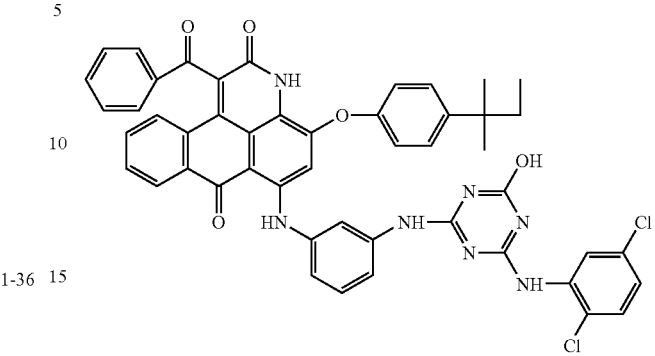
1-41
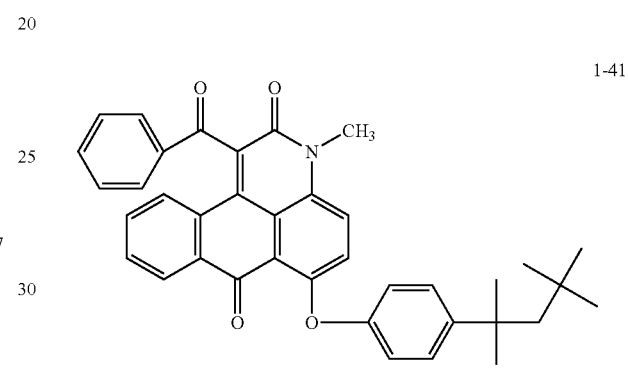
1-42
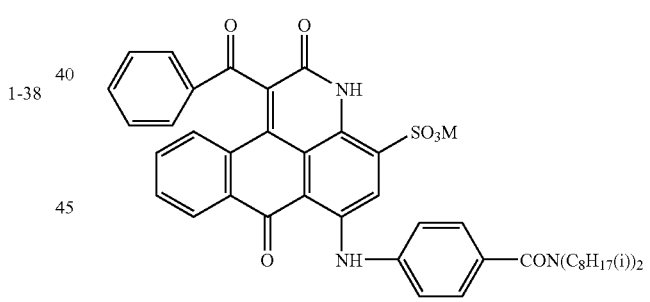
1-43
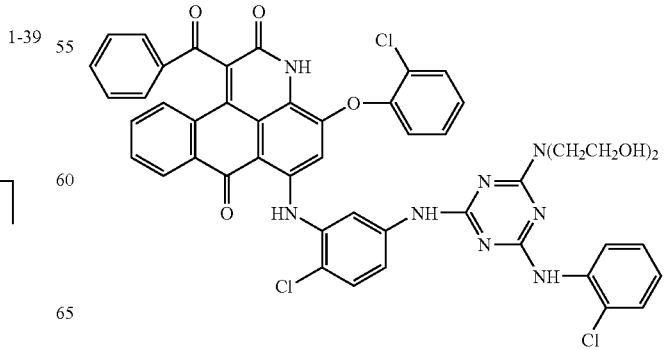

1-44
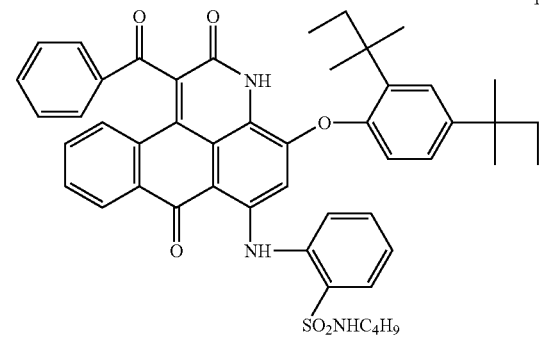
1-45
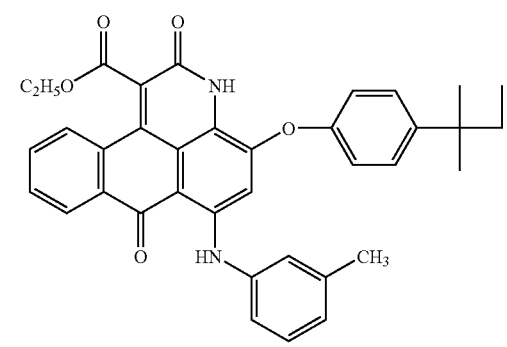
1-46
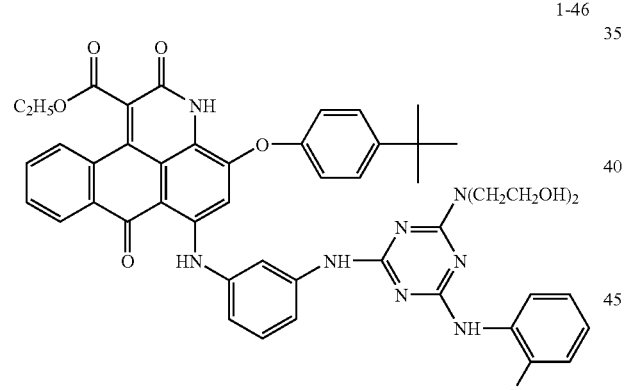
1-47
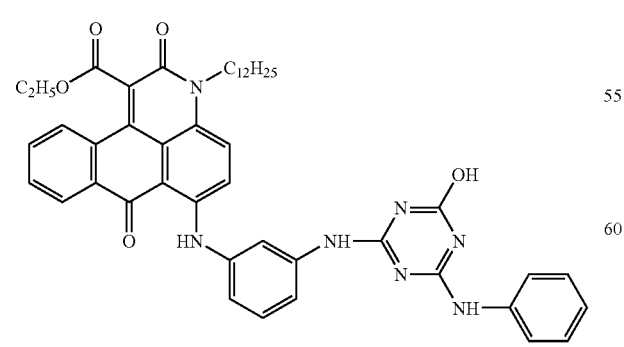
1-48
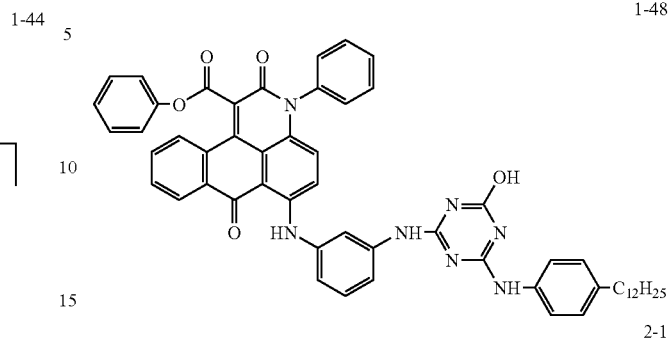
2-1
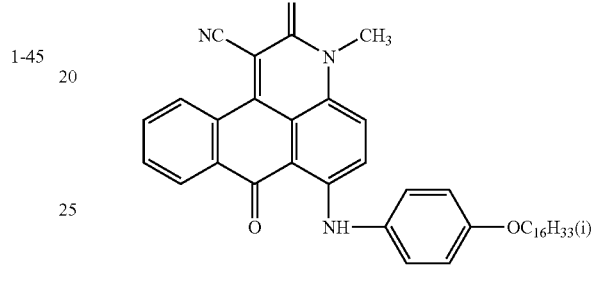
2-2
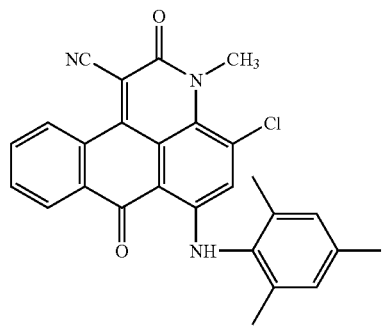
2-3
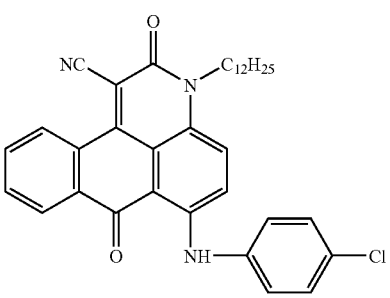
2-4
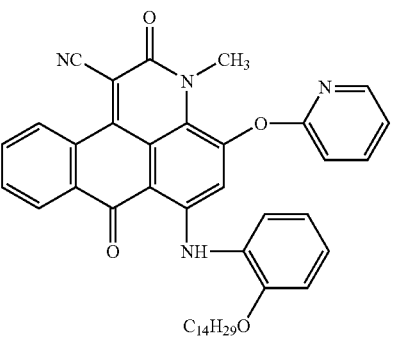

-continued
2-5
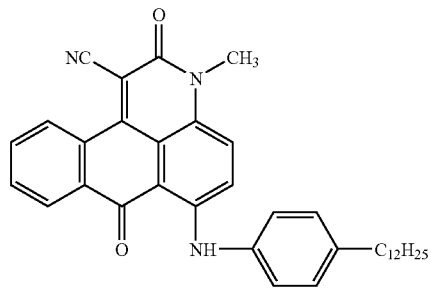
2-10
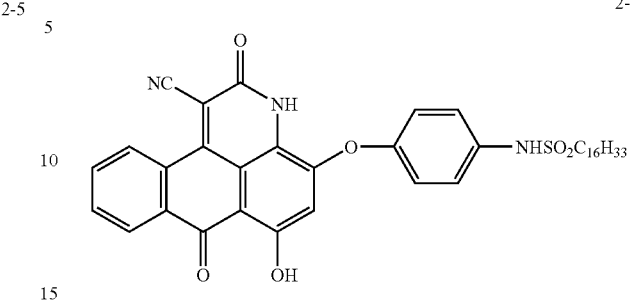
2-6
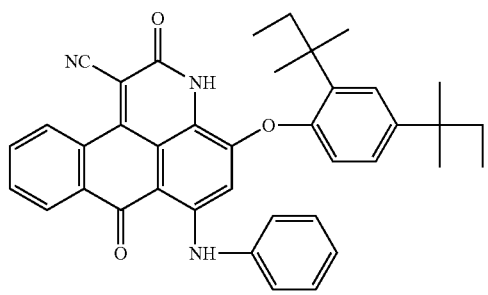
2-11
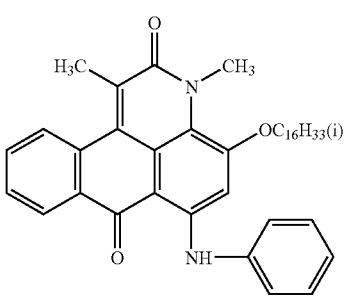
2-7
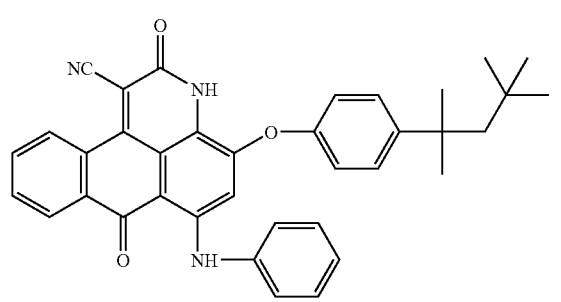
2-12
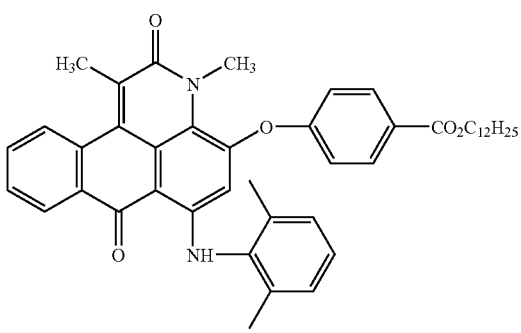
2-8
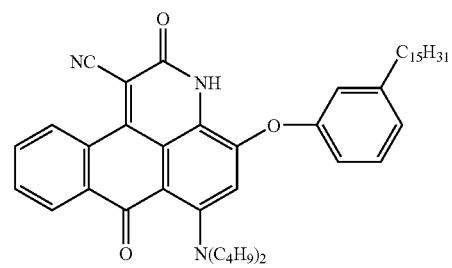
2-13
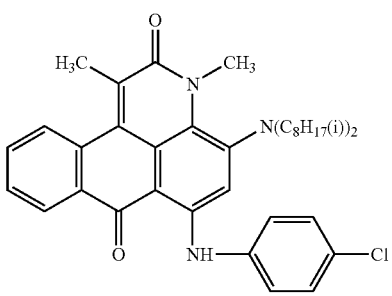
2-9
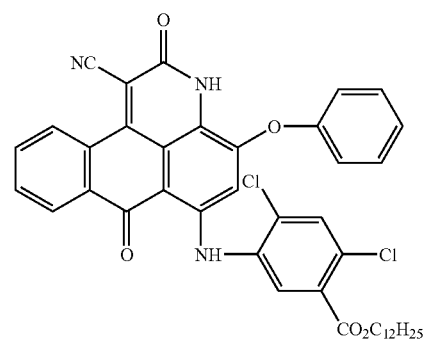
2-14
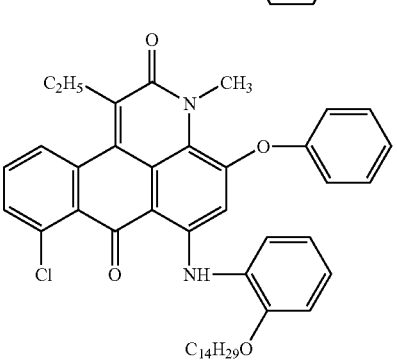

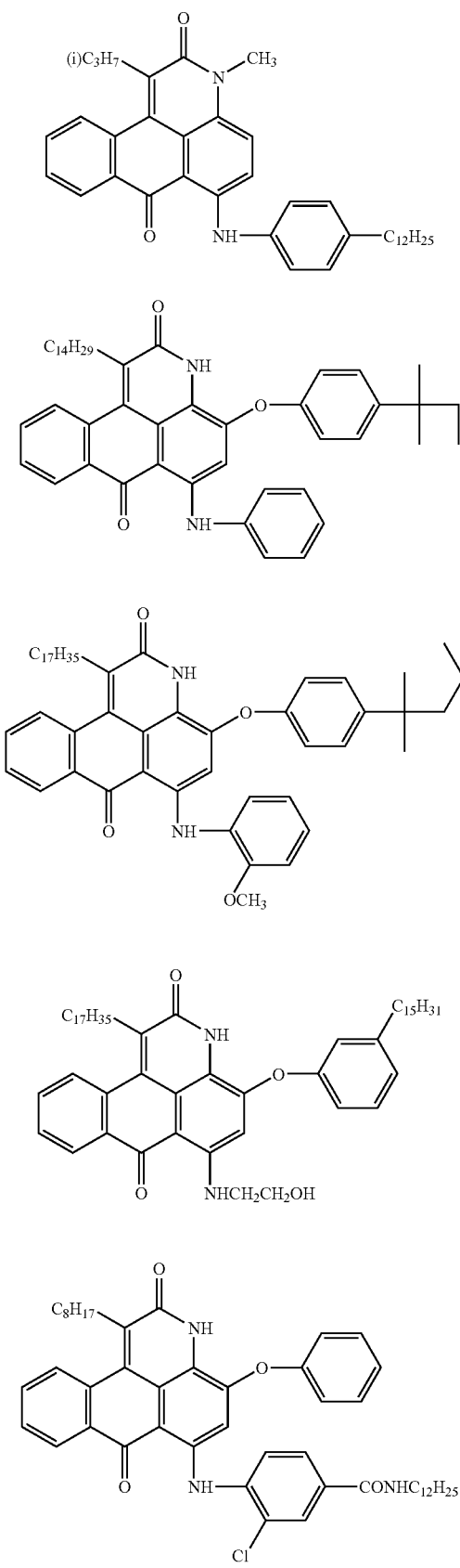

-continued
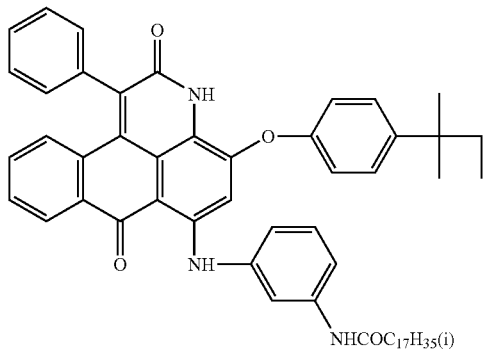
2-25
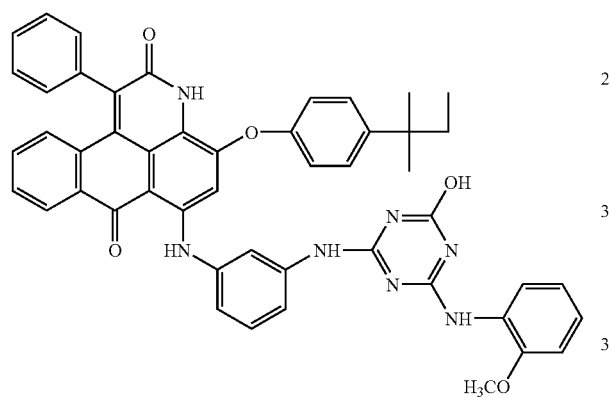
2-26
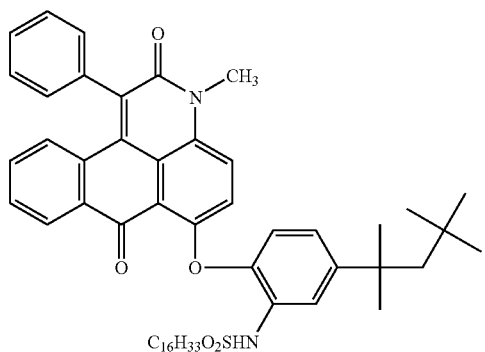
2-27
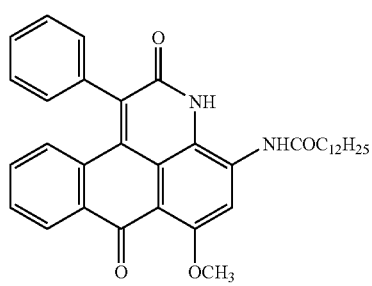
2-28
-continued
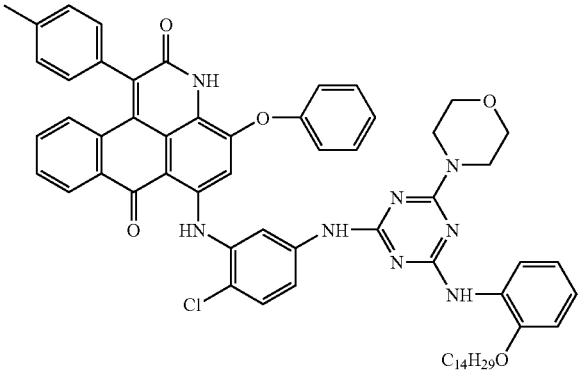
2-29
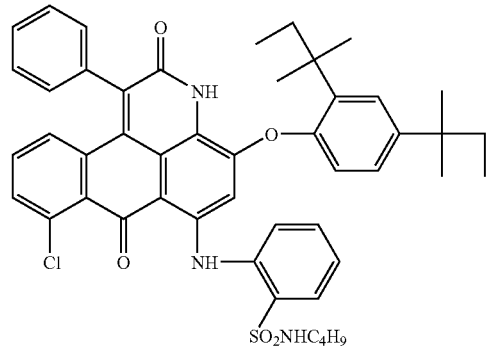
2-30
Specific examples of synthesis of compounds of formula (1) or (2) are described below.
(1) Synthesis of Compound 1–37
Exemplified compound 1–37 was synthesized, as described below, according to the following scheme (1):
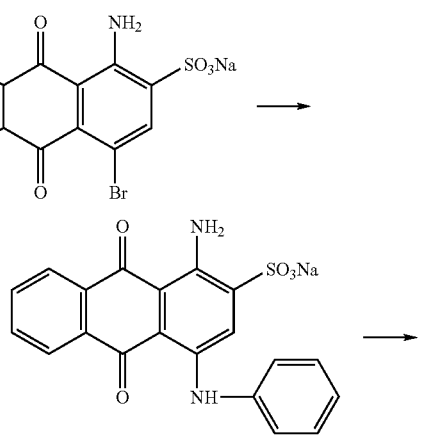
(1a)

-continued

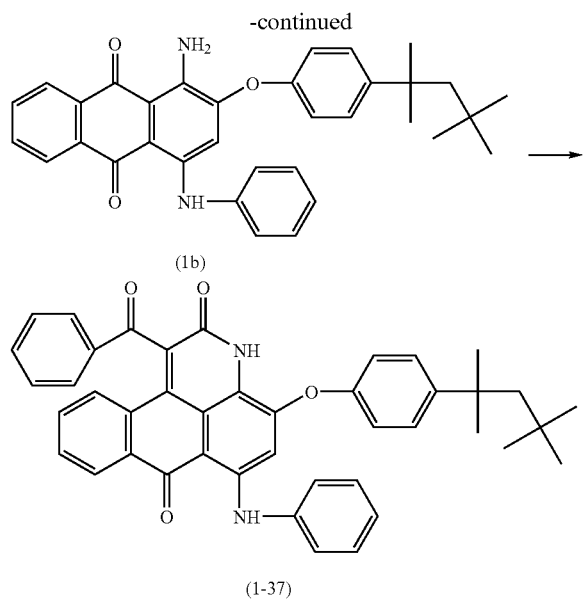

(1b)

(1-37)

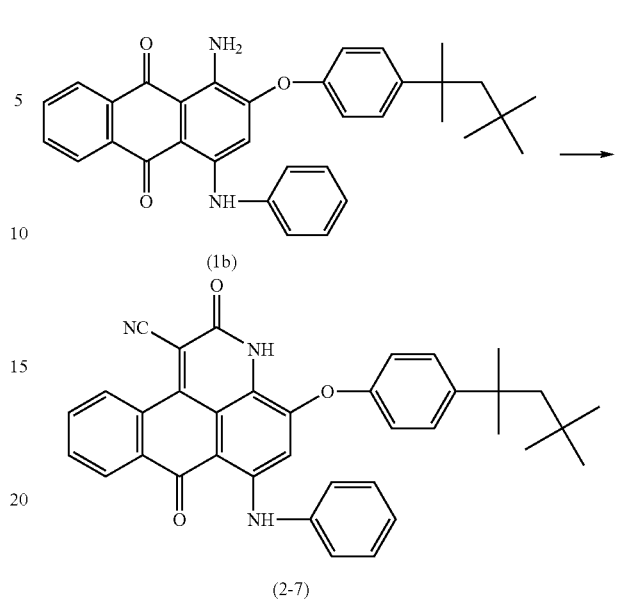

(1b)

(2-7)

i) Synthesis of Intermediate (1a)

In 400 ml of water was dispersed 40.4 g (0.1 mole) of bromamic acid and 7.8 g of copper sulfate pentahydrate and 9.2 g of iron sulfate hexahydrate were added thereto and stirred. Further thereto, 9.5 g (0.1 mole) of aniline was added and reacted with heating under reflux for 3 hrs. After completion of reaction, the reaction mixture was cooled and precipitated crystals were filtered and washed with a saturated sodium chloride solution. Obtained crystals were dried at 60° C. and 41.6 g of a crude intermediate (1a) was obtained at a yield of 100%. The obtained crude intermediate (1a), as illustrated above, was used in the subsequent stage without being subjected to purification.

ii) Synthesis of Intermediate (1b)

A mixture of 120 g (0.58 mole) of p-t-octylphenol and 14 g (0.24 mole) of potassium hydroxide was heated at 160° C. and almost dissolved. Thereto, 20.8 g of the crude intermediate (la) was gradually added and reacted for 4 hrs. After completion of reaction, acetic acid was added at 100° C. and methanol was added at ca. 50° C. and stirred with heating under reflux for 1 hr. Thereafter, the reaction mixture was cooled, then, precipitated crystals were filtered at room temperature and washed with methanol, water and methanol in that order. The obtained crystals were dried 60° C. to obtain 37.3 g (a yield of 72%) an intermediate (1b), as illustrated above.

iii) Synthesis of Exemplified Compound 1–37

In 250 ml of xylene, 25.9 g (0.05 mole) of intermediate (1b) and 9.61 g (0.05 mole) of ethyl benzoylacetate were reacted with heating under reflux for 6 hrs., while distilling off ethanol. After completion of reaction, precipitated crystals were filtered and recrystallized in a mixed solution of N,N-dimethylformamide and ethanol to obtain 22.0 g of the objective compound 1–37 (yield: 68%). The structure was identified by H-NMR and mass spectrometry.

Synthesis of Compound 2–7

Exemplified compound 2–7 was synthesized according to the following scheme (2):

i) Synthesis of Compound 2–7

In 250 ml of o-dichlorobenzene, 25.9 g (0.05 mole) of the foregoing intermediate (1b) and 5.66 g (0.05 mole) of ethyl cyanoacetate were reacted with heating under reflux for 6 hrs., while distilling off ethanol. After completion of reaction, precipitated crystals were filtered and then recrystallized in acetonitrile to obtain the objective compound, 2–7 (yield: 61%).

The dyes according to this invention may be used alone or in their combination. The dyes may also be used in combination with other dyes falling outside the scope of this invention.

The ink jet recording liquid containing the dye of this invention can use a variety of solvents including aqueous solvents, oil solvents and solid (phase change) solvents. Water (preferably, deionized water) and water-soluble organic solvents are generally employed as an aqueous solvent.

Examples of a water-soluble organic solvent include alcohols (e.g., methanol, ethanol, propanol, isopropanol, butanol, isobutanol, sec-butanol, tert-butanol, pentanol, hexanol, cyclohexanol, benzyl alcohol), polyhydric alcohols (e.g., ethylene glycol diethylene glycol, triethylene glycol, polyethylene glycol, propylene glycol, dipropylene glycol, polypropylene glycol, butylenes glycol, hexanediol, pentanediol, glycerin, hexanetriol, thiodiglycol), polyhydric alcohol ethers (e.g., ethylene glycol monomethyl ether, ethylene glycol monoethyl ether, ethylene glycol monobutyl ether, diethylene glycol monomethyl ether, diethylene glycol monomethyl ether, diethylene glycol monobutyl ether, propylene glycol monomethyl ether, propylene glycol monobutyl ether, ethylene glycol monomethyl ether acetate, triethylene glycol monomethyl ether, triethylene glycol monoethyl ether, ethylene glycol monophenyl ether, propylene glycol monophenyl ether), amines (e.g., ethanolamine, dimethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine, tetramethylpropylenediamine), amides (e.g., formamide, N,N-dimethylformamide, N,N-dimethylacetoamide), heterocycles (e.g., 2-pyrrolidone, N-methyl-2-pyrrolidone, cyclohexylpyrrolidone, 2-oxazolidone, 1,3-dimethyl-2-imidazolidone)sulfoxides (e.g., dimethylsulfoxide), sulfones (e.g., sulfolane), urea, acetonitrile and acetone.

When the dye of this invention is soluble in the foregoing aqueous solvent the solvent is usable as it is.

When a dye relating to this invention is in the form of a solid insoluble in a solvent system, the dye may be dispersed in the solvent in the form of fine particles using various types of dispersing machines (e.g., ball mill, sand mill, atreiter, roll mill, agitator mill, Henschell mixer, colloid mill, ultrasonic homogenizer, pearl mill, jet mill or ongmill). The dye may be dissolved in a solvent and then dispersed in the solvent system using a polymeric dispersing agent or a surfactant. In the case of being in the form of insoluble liquid or semi-melt as such, the dye is dissolved in an organic solvent and then dispersed in the solvent system together with a polymeric dispersing agent or a surfactant. It is preferred that the dye is dissolved in an organic solvent and dispersed together with an oil-soluble polymer in the form of fine particles dispersed in an aqueous solvent. Thus, the dye is preferably in the form of polymeric particles containing the dye and dispersed in the medium. Specific examples of preparation of aqueous solvents used for the ink jet recording liquid are described in JP-A Nos. 5-148436, 5-295312, 7-97541, 7-82515 and 7-118584.

Oil-soluble polymers usable in this invention are not specifically limited and can be chosen according to the object. Of oil-soluble polymers, vinyl polymers are preferred. Commonly known vinyl polymers are usable, including a water-insoluble type, water-dispersible type (self-emulsification) type and water-soluble type. Of these, the water-dispersible type is preferred in terms of preparation easiness and dispersion stability of colored fine particles. The water-dispersible vinyl polymers include, for example, an ion-dissociative type, a nonionic dispersible group-containing type and a combination thereof. Examples of an ion-dissociative vinyl polymer include a vinyl polymer containing a cationic dissociative group such as a tertiary amino group and a vinyl polymer containing an anionic dissociative group such as a carboxylic acid or sulfonic acid. Nonionic dispersible group-containing vinyl polymers include, for example, a vinyl polymer containing a nonionic dispersible group such as a polyethyleneoxy-chain. Of these, an ion-dissociative vinyl polymer containing an anionic dissociative group, a vinyl polymer containing a nonionic dispersible group and a their combination type vinyl polymer are preferred in terms of preparation easiness and dispersion stability of colored fine particles.

Monomers forming the foregoing vinyl polymer include, for example, acrylic acid esters and methacrylic acid esters. Specific examples of acrylic acid esters include methyl acrylate, ethyl acrylate, n-propyl acrylate, isopropyl acrylate, n-butyl acrylate, isobutyl acrylate, sec-butyl acrylate, tert-butyl acrylate, amyl acrylate, hexyl acrylate, 2-ethylhexyl acrylate, octyl acrylate, tert-octyl acrylate, 2-chloroethyl acrylate, 2-bromoethyl acrylate, 4-chlorobutyl acrylate, cyanoethyl acrylate, 2-acetoxyethyl acrylate, benzyl acrylate, methoxyethyl acrylate, 2-chlorocyclohexyl acrylate, cyclohexyl acrylate, furfuryl acrylate, tetrahydrofurfuryl acrylate, phenyl acrylate, 5-hydroxypropyl acrylate, 2,2-dimethyl-3-hydroxypropyl acrylate, 2-methoxyethyl acrylate, 3-methoxybutyl acrylate, 2-ethoxyethyl acrylate, 2-butoxyethyl acrylate, 2-(2-methoxyethoxy)ethyl acrylate, 2-(2-butoxyethoxy)ethyl acrylate, glycidyl acrylate, 1-bromo-2-methoxyethyl acrylate, 1,1-dichloro-2-ethoxyethyl acrylate, 1,1,2,2-tetrafluoroethyl acrylate and 1H,1H,2H,2H-peerfluorodecyl acrylate.

Specific examples of methacrylic acid esters include methyl methacrylate, ethyl methacrylate, n-propyl methacrylate, isopropyl methacrylate, n-butyl methacrylate, isobutyl methacrylate, sec-butyl methacrylate, tert-butyl methacrylate, amyl methacrylate, hexyl methacrylate, cyclohexyl methacrylate, benzyl methacrylate, chlorobenzyl methacrylate, octyl methacrylate, stearyl methacrylate, 2-(3-phenylpropyl)ethyl methacrylate, furfuryl methacrylate, tetrahydrofurfuryl methacrylate, phenyl methacrylate, cresyl methacrylate, naphthyl methacrylate, 2-hydroxyethyl methacrylate, 4-hydroxybutyl methacrylate, triethylene glycol monomethacrylate, dipropylene glycol monomethacrylate, 2-methoxyethyl methacrylate, 30methoxybutyl methacrylate, 2-ethoxyethyl methacrylate, 2-iso-propoxyethyl methacrylate, 2-butoxyethyl methacrylate, 2-(2-methoxylethoxy)ethyl methacrylate, 2-(20ethoxyethoxy)ethyl methacrylate, 2-(2-butoxyethoxy)ethyl methacrylate, 2-acetoxyethyl methacrylate, 2-acetoacetoxyethyl methacrylate, allyl methacrylate, glycidyl methacrylate, 2,2,2-trifluoroethyl methacrylate, and 1H,1H,2H,2H-peerfluorodecyl methacrylate.

Specific examples of vinyl esters include vinylacetate, vinylpropionate, vinylbutyrate, vinylisobutyrate, vinylcaproate, vinylchloroacetate, vinylmethoxyacetate, vinylphenylacetate, vinylbenzoate and vinylsalycilate.

Specific examples of acrylamides include acrylamide, methylacrylamide, ethylacrylamide, propylacrylamide, butylacrylamide, tert-butylacrylamide, tert-octylacrylamide, cyclohexylacrylamide, benzylacrylamide, hydroxymethylacrylamide, methoxymethylacrylamide, butoxmethylacrylamide, methoxyethylacrylamide, phenylacrylamide, dimethylacrylamide, diethylacrylamide, β-cyanoethylacrylamide, N-(2-acetoactoxyethyl)acrylamide, and diacetone acrylamide.

Specific examples of methacrylamides include methacrylamide, methylmethacrylamide, ethylmethacrylamide, propylmethacrylamide, butylmethacrylamide, tert-butylmethacrylamide, cyclohexylmethacrylamide, benzylmethacrylamide, hydroxymethylmethacrylamide, methoxyethylmethacrylamide, phenylmethacrylamide, dimethylmethacrylamide, β-cyanoethylmethacrylamide and N-(acetoacetoxyethyl)methacrylamide.

Specific examples of olefins include cyclopentadiene, ethylene, propylene, 1-butene, 1-pentene, vinyl chloride, vinylidene chloride, isoprene, chloroprene, butadiene and 2,3-dimethylbutadiene. Styrenes includem for example, styrene, methylstyrene, dimethylstyrene, trimethylstyrene, ethylstyrene, isopropylstyrene, chlromethylstyrene, methoxystyrene, acetoxystyrene, chlorostyrene, dichlorostyrene, bromostyrene and methyl vinylbenzoate.

Vinyl ethers include, for example, methyl vinyl ether, butyl vinyl ether, hexyl vinyl ether and methoxyethyl vinyl ether.

Other monomers include, for example, butyl crotonate, hexyl crotonate, dimethylitaconate, dibutyl itaconate, diethyl maleate, diethyl maleate, dimethyl maleate, diethyl fumarate, dimethyl fumarate, dibutyl fumarate, methyl vinyl ketone, phenyl vinyl ketone, methoxyethyl vinyl ketone, N-vinyloxazolidone, N-vinylpyrrolidone, vinilidene chloride, styrene malonic nitrile, vinylidene, diphenyl-2-acryloyloxyethylphosphate, diphenyl-2-methacryloyloxyethylphosphate, dibutyl-2-acryloyloxyethylphosphate and dioctyl-2-methacryloyloxyethylphosphate.

Dissociative group-containing monomers include anionic dissociative group-containing monomers and cationic dissociative group-containing monomers. Anionic dissociative group-containing monomers include, for example, a carboxylic acid monomer, a sulfonic acid monomer, and a phosphoric acid monomer. Specific examples of the carboxylic acid monomer include acrylic acid, methacrylic acid, itaconic acid, maleic acid, fumaric acid, citraconic acid, crotonic acid, itaconic acid monoalkyl ester (e.g., monomethyl itaconate, monoethyl itaconate or monobutyl itaconate) and maleic acid monoalkyl ester (e.g., monomethyl maleate, monoethyl maleate or monobutyl maleate).

Specific examples of the sulfonic acid monomer include styrene sulfonic acid, vinylsulfonic acid, acryloyloxyalkylsulfonic acid (e.g., acryloyloxymethyl-sulfonic acid, acryloyloxyethylsulfonic acid or acryloyloxypropylsulfonic acid), methacryloyloxyalkylsulfonic acid (e.g., methacryloyloxymethylsulfonic acid, methacryloyl-oxyethylsulfonic acid or methacryloyloxypropylsulfonic acid), acrylamidoalkylsulfonic acid (e.g., 2-acrylamido-2-methylethanesulfonic acid, 2-acrylamido-2-methylpropanesulfonic acid, or 2-acrylamido-2-methylbutanesulfonic acid), methacrylamidoalkylsulfonic acid (e.g., 2-methacrylamido-2-methylethanesulfonic acid, 2-methacrylamido-2-methylpropanesulfonic acid or 2-methacrylamido-2-methylbutanesulfonic acid). Specific examples of the phosphoric acid monomer include vinylphosphonic acid and methacryloyloxyethylphosphonic acid. Of these, acrylic acid, methacrylic acid, styrenesulfonic acid, vinylsulfonic acid, acrylamidoalkylsulfonic acid and methacrylalkylsulfonic acid are preferred; and acrylic acid, methacrylic acid, styrenesulfonic acid, 2-acrylamido-2-methylpropanesulfonic acid and 2-acrylamido-2-methylbutanesulfonic acid are more preferred.

Cationic dissociative group-containing monomers include, for example,tertiary amino group-containing monomers such as dialkylaminoethyl methacrylate and dialkylaminoethyl methacrylate.

Nonionic dissociative group-containing monomers include, for example, ester of a polyethylene glycol monoalkyl ether and a carboxylic acid monomer, ester of a polyethylene glycol monoalkyl ether and a phosphoric acid monomer, a vinyl group-containing urethane formed of a polyethylene glycol monoalkyl ether and an isocyanate group-containing monomer, and a macromonomer containing a polyvinyl alcohol structure. The repeating number of the ethyleneoxy moiety of the foregoing polyethylene glycol monoalkyl ether is preferably 8 to 50, and more preferably 10 to 30. The carbon number of the alkyl group of the foregoing polyethylene glycol monoalkyl ether is preferably 1 to 20, and more preferably 1 to 12.

The foregoing monomers may form a vinyl polymer, used alone or in combination of two or more, which is chosen based on the object of the vinyl polymer (e.g., Tg adjustment, solubility improvement or dispersion stability)

In this invention, it is preferred that the afore-described fine polymeric particles containing a dye are each comprised of a polymeric core containing the dye and a polymeric shell. Thus, the polymeric particles each have a core surrounded by a shell. The dye content (concentration) of the shell is preferably not more than 0.8 (more preferably not more than 0.5) of the dye content (concentration) of the core which has not formed shell. The dye content can be determined using a mass spectrometer such as TOS-SIM. Using such TOS-SIM, the total amount of ions having a mass number of 1 to 1000 is determined with respect to the surface of the respective fine particles, and the dye content is determined from the total amount of ions due to the dye. The dye content of the shell is compared with that of the core which has not as yet formed shell. The TOS-SIM can make elemental analysis to a depth of a few nm from the surface, thereby enabling analysis of core-shell particles. The volume-average particle size is preferably 5 nm to 500 nm, and more preferably 10 nm to 300 nm.

The volume-average particle size is determined in such a manner that the mean circle-converted diameter (equivalent circle diameter) obtained from an average value of the projected area (of at least 100 particles) using a transmission electron micrograph (TEM) is converted to the diameter of a sphere. The volume-average particle size and standard deviation of particle size are determined, and after which the coefficient of variation (also denoted as variation coefficient) is calculated by dividing the standard deviation by the volume-average particle size. The coefficient of variation can also be determined by employing the dynamic light scattering method. For example, there are employed Laser Particle Size Analysis System (available from Otsuka Denshi Co.) and Zeta Sizer (available from Marbern Co.). The greater a coefficient of variation of particle size indicates the broader the particle size distribution. A coefficient of variation exceeding 80% represents a very broad particle size distribution, easily resulting in nonuniform core-shell thickness and variation in surface physical property among particles. Variation in surface physical property easily causes aggregation of particles, resulting in clogging in the ink jet head. Aggregation of particles also tends to cause light scattering of a dye on the media, leading to deteriorated image quality. The coefficient of variation is preferably not more than 50%, and more preferably not more than 30%.

The amount of polymer used in a shell is preferably 5% to 95% by weight (more preferably 10% to 90% by weight) of the total polymer amount. An amount less than 5% by weight results in a shell of an insufficient thickness and a core containing a large amount of a dye partially appears on the surface. An excessive polymer of a shell easily results in deteriorated protecting ability for the dye of the core.

The total dye amount is preferably 20% to 1,000% by weight of the total polymer amount. An insufficient dye amount relative to polymer results in insufficient image density after ejection, while an excessive dye amount leads to insufficient protecting ability of a polymer.

In this invention, core-shell formation is achieved by a method in which a dye containing a polymer core is formed, followed by formation of a shell or a method in which the core and shell are concurrently formed.

Shell Formation after Particulate Core Formation

A dye-containing polymer forming a core can be prepared by various methods, including, for example, a method in which an oil-soluble dye is dissolved in a monomer and after being emulsified in water, polymerization is performed to occlude the dye within a polymer; a method in which a polymer and a dye are dissolved in an organic solvent and after being emulsified in water, the organic solvent is removed; and a method in which porous polymer particles are added to a dye solution to cause the dye to be adsorbed onto or impregnated into the particles. Techniques for forming a polymer shell include, for example, a technique of adding a dispersion of a water-soluble polymer to an aqueous polymer core dispersion to cause the water-soluble polymer to be adsorbed onto the core; a method in which a monomer is gradually dropwise added to concurrently perform polymerization and deposition on the core surface; and a method in which a polymer dissolved in an organic solvent is dropwise added, causing the polymer to be adsorbed onto the core surface simultaneously with deposition. Alternatively, a pigment is kneaded with a polymer and then dispersed in an aqueous medium to form a polymer-coated pigment core, followed by formation of a shell by the foregoing methods.

Concurrent Core and Shell Formation

There are included a method in which a core-forming polymer and a dye are dissolved or dispersed in a monomer to form a shell after polymerization and perform polymerization after being suspended and a method in which such a solution is gradually dropwise added into water containing a surfactant micelle to perform emulsion polymerization. Alternatively, a dye is dissolved or dispersed in a mixture of a monomer forming a core after polymerization and a monomer forming a shell after polymerization to perform suspension polymerization or emulsion polymerization.

In this invention, the dye-containing ink jet recording liquid preferably exhibits a viscosity of not more than 0.04 Pa·s, and more preferably not more than 0.03 Pa·s at the time of ejection. The ink jet recording liquid preferably exhibits a surface tension of 200 to 1000 μN/cm, and more preferably 300 to 800 μN/cm at the time of ejection.

The dye of this invention is used preferably in an amount of 0.1 to 25%, and more preferably 0.5 to 10% by weight, based on the ink jet recording liquid.

Resin type dispersants usable in this invention preferably are polymeric compounds having a molecular weight of 1,000 to 1,000,000, which are contained preferably in an amount 0.1 to 50% by weight, based on the ink jet recording liquid.

To the ink jet recording liquid, a viscosity adjusting agent, a surface tension adjusting agent, a specific resistance adjusting agent, a film forming agent, a dispersing agent, a surfactant, a UV absorber, an antioxidant, an anti-discoloring agent, an antimold or an antirust may be added for the purpose of enhancing performances such as ejection stability, and print head or ink cartridge conformance.

The ink jet recording liquid of this invention is not limited with respect to the recording system used but is preferably employed as an ink jet recording liquid for use in an on-demand system ink jet printers. On-demand systems include, for example, an electric-to-mechanical conversion system (e.g., a single cavity type, a double cavity type, a bender type, a piston type, a share-mode type or shared wall type), an electricity-to-heat conversion system (e.g., a thermal ink jet type or bubble jet (R) type), an electrostatic suction type (e.g., an electric field control type or a slit jet type) and a discharge type (e.g., a spark jet type).

EXAMPLES

The present invention will be further described based on examples but embodiments of this invention are by no means limited to these.

Example 1

Preparation of Ink

A dye shown in Table 1 was weighed so that the final ink contained 2% by weight of the dye. The dye was dissolved in a solvent, which was adjusted so as to form a composition comprised of 15% ethylene glycol, 15% glycerin, 0.3% Surfinol 465 (available from Nishin Kagaku Kogyo Ltd., Co.) and the remainder of pure water, as shown in Table 1. The solution was filtered with a 2 μm membrane filter to remove dust and coarse particles to obtain ink jet ink sample 1. Similarly, ink samples 2 to 10 were each obtained.

Evaluation

Using each of the foregoing ink samples, ink jet printing was performed on Konica Photo Jet Paper Photolike QP glossy (available from Konica Corp.), using a commercially available ink jet printer (PM-800, available from Epson Corp.). Obtained images were evaluated with respect to lightfastness, color and storage stability, according to the procedure described below. Results are shown in Table 1.

Lightfastness

Print samples were exposed in a xenon fadometer for 96 hrs. and deterioration of reflection spectral density at the visible absorption peak wavelength was determined according the following equation:

lightfastness (%)=(absorption peak density of exposed sample)/(absorption peak density of unexposed sample)×100.

Color

Reflection spectrum of the respective print samples was measured at intervals of 10 nm in the range of 390 to 730 nm and a* and b* values were determined based on CIE L*a*b* color space. Preferred magenta image tone was defined as follows:

preferred a*: 76 or more
preferred b*: −30 or less
A: both a* and b* being within the preferred region,
B: only one of a* and b* being within the preferred region,
C: both a* and b* being outside the preferred region.

Storage Stability

After ink samples were each aged in a sealed glass container for 1 week at 80° C., ink jet printing was conducted similarly. Evaluation was made with respect to the presence/absence of abnormal ejection during continuous 500 hr. ejection and the foregoing color, based on the following criteria:

A: no abnormality during continuous ejection and color change from fresh ink being within +10 with respect to a* and b* values, C: abnormal ejection occurred and color change being more than 10 with respect to at least one of a* and b* values.

TABLE 1

| Sample No. | Dye | Solvent | | | Light-fastness | Color | Storage Stability |
|---|---|---|---|---|---|---|---|
| | | Ethylene Glycol (wt %) | Glycerin (wt %) | Water (wt %) | | | |
| 1 | Comp. Dye 1 | 15 | 15 | 70 | 30 | A | A |
| 2 | Comp. Dye 2 | 15 | 15 | 70 | 58 | A | A |
| 3 | Comp. Dye 3 | 45 | 45 | 10 | 55 | B | C |
| 4 | 1–6 | 45 | 45 | 10 | 78 | A | A |
| 5 | 1–8 | 45 | 45 | 10 | 80 | A | A |
| 6 | 1–12 | 45 | 45 | 10 | 81 | A | A |
| 7 | 1–33 | 45 | 45 | 10 | 79 | A | A |
| 8 | 1–46 | 45 | 45 | 10 | 82 | A | A |
| 9 | 2–7 | 45 | 45 | 10 | 80 | A | A |
| 10 | 2–23 | 45 | 45 | 10 | 80 | A | A |

Comp. Dye 1

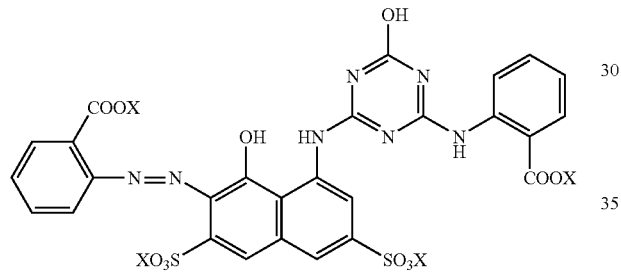

Comp. Dye 2

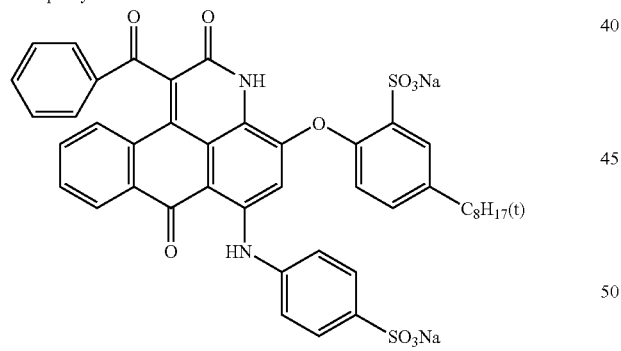

Comp. Dye 3

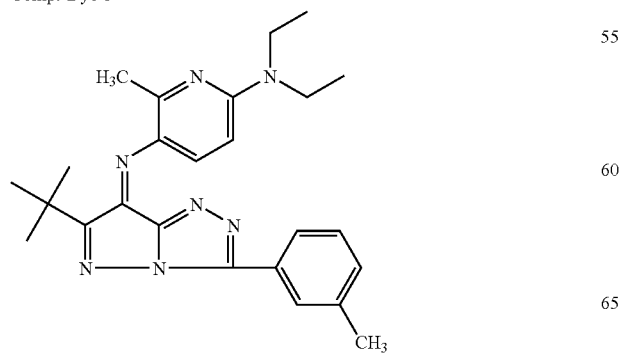

As apparent from the results, it was proved that samples of this invention led to improved lightfastness, superior color and improved storage stability, compared to comparative samples.

Example 2

Dyes shown in Table 2, each of 5 g, 5 g of polyvinyl butyral (BL-S, average molecular weight of 350, available from Sekisui Kagaku Co.) and 50 g of ethyl acetate were put into a separable flask and after the atmosphere within the flask was replaced with $N_2$, the foregoing polymer and dye were completely dissolved. After 100 g of an aqueous solution containing 2 g of sodium laurylsulfonate was dropwise added thereto, the mixture was emulsified over a period of 300 sec using an ultrasonic homogenizer (UH-150 type, available from S. S. T. Co.). Thereafter, ethyl acetate was removed under reduced pressure to obtain fine colored particles impregnated with a dye. Two sets of this colored dispersion were prepared for each sample. One of them was used as such for preparation of a water-base ink, as described below. To the other one, 0.15 g of potassium persulfate was added and dissolved and after being heated to 70° C. with a heater, a mixture of 2 g of styrene and 1 g of 2-hydroxyethyl methacrylate was dropwise added and allowed to react over a period of 7 hrs. to obtain core-shell type colored particles.

Preparation of Water-Based Ink

Dyes shown in Table 2 were each weighed so that the finished ink contained 2% by weight of the respective dyes. The dye was dissolved in a solvent, which was adjusted so as to form a composition comprised of 15 wt % ethylene glycol, 15 wt % glycerin, 3 wt % triethylene glycol, 0.3% Surfinol 465 and the rest, pure water. The solution was filtered with a 2 μm membrane filter to remove dusts and coarse particles to obtain ink jet printing ink samples 11 to 30, as shown in Table 2.

Evaluation

Similarly to Example 1, ink samples were aged for 7 days at 60° C. Evaluation was made with respect to variation in particle size between before and after being aged, filterability after being aged, and color and lightfastness similarly to Example 1. Results are shown in Table 2.

Variation in Particle Size

Ink sample were each aged for 7 days at 60° C. and variation in particle size was determined according to the following equation:

Particle Size Variation (%)={[(average particle size after aging)−(average particle size before aging)]/(average particle size before aging)}×100.

Evaluation was made based on the following criteria:
A: variation less than 5% (excellent level),
B: variation from 5% to less than 10% (acceptable level)
C: variation of 10% or more (unacceptable level).

Filterability

After being aged for 7 days at 60° C., 5 ml of the respective inks was taken out and filter with 0.8 μm cellulose acetate membrane filter. Filterability was evaluated based on the following criteria:
A: the entire amount was filtered,
B: at least half the amount was filtered (acceptable level,
C: at least half the amount was not filtered (unacceptable level).

TABLE 2

| Sample No. | Dye | Shell Formation | Variation in Particle Size | Filterability | Color | Lightfastness |
|---|---|---|---|---|---|---|
| 11 | Comp. Dye 3 | No | B | B | B | 60 |
| 12 | Comp. Dye 4 | No | C | C | A | 63 |
| 13 | 1–9 | No | B | B | A | 90 |
| 14 | 1–14 | No | B | B | A | 91 |
| 15 | 1–28 | No | B | B | A | 90 |
| 16 | 1–37 | No | B | B | A | 92 |
| 17 | 1–45 | No | B | B | A | 89 |
| 18 | 2–6 | No | B | B | A | 89 |
| 19 | 2–19 | No | B | B | A | 91 |
| 20 | 2–30 | No | B | B | A | 92 |
| 21 | Comp. Dye 3 | Yes | B | A | B | 65 |
| 22 | Comp. Dye 4 | Yes | B | A | A | 69 |
| 23 | 1–9 | Yes | A | A | A | 95 |
| 24 | 1–14 | Yes | A | A | A | 94 |
| 25 | 1–28 | Yes | A | A | A | 95 |
| 26 | 1–37 | Yes | A | A | A | 96 |
| 27 | 1–45 | Yes | A | A | A | 94 |
| 28 | 2–6 | Yes | A | A | A | 94 |
| 29 | 2–19 | Yes | A | A | A | 95 |
| 30 | 2–30 | Yes | A | A | A | 94 |

Comp. Dye 4

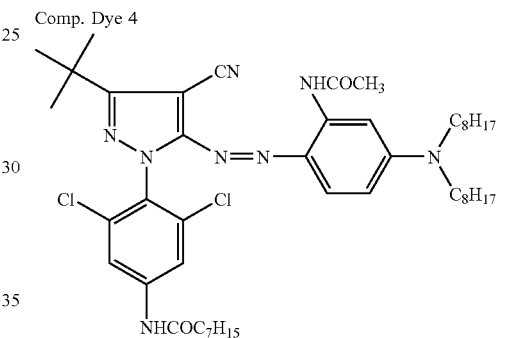

As apparent from the results, it was proved that samples 13 to 20 according to this invention exhibited superior color and improved lightfastness and also led to superior results in ink particle size variation, filterability and dispersion stability, compared to the comparative samples. It was further noted that ink particles having a core-shell structure exhibited remarkable effects and samples 23 to 30 led to marked superior results in storage stability as well as color and lightfastness.

What is claimed is:

1. An ink jet recording liquid comprising a medium and an oil-soluble dye represented by the following formula (2):

formula (2)

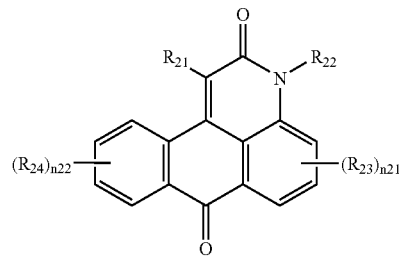

wherein $R_{21}$ is an alkyl group, an aryl group or cyano group; $R_{22}$, $R_{23}$ and $R_{24}$ are each a hydrogen atom or a substituent; n21 is an integer of 1 to 3 and n22 is an integer of 1 to 4.

2. The ink jet recording liquid of claim 1, wherein the recoding liquid further comprises an oil-soluble polymer and the dye forms together with the polymer fine solid particles dispersed in the medium.

3. The ink jet recording liquid of claim 2, wherein the polymer is a vinyl polymer.

4. The ink jet recording liquid of claim 2, wherein the particles are each comprised of a core surrounded by a shell.

5. The ink jet recording liquid of claim 4, wherein the core contains the dye.

6. An ink jet recording liquid comprising a medium, an oil-soluble dye represented by the following formula (1) and an oil soluble polymer, wherein the dye forms together with the polymer fine solid particles dispersed in the medium:

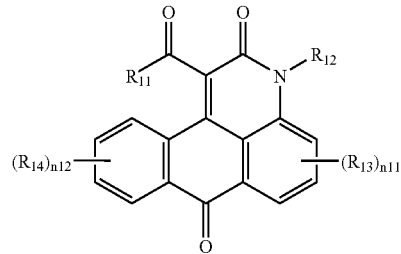

formula (1)

wherein $R_{11}$ is a straight chain alkyl group, an aryl group, an alkoxy group or an aryloxy group; $R_{12}$, $R_{13}$ and $R_{14}$ are each a hydrogen atom or a substituent; n11 is an integer of 1 to 3 and n12 is an integer of 1 to 4.

7. The ink jet recording liquid of claim 6, wherein the polymer is a vinyl polymer.

8. The ink jet recording liquid of claim 6, wherein the particles are each comprised of a core surrounded by a shell.

9. The ink jet recording liquid of claim 8, wherein the core contains the dye.

* * * * *